May 2, 1961  E. C. SCHESSER  2,982,079
MOWER SAFETY GUARD
Filed June 4, 1957
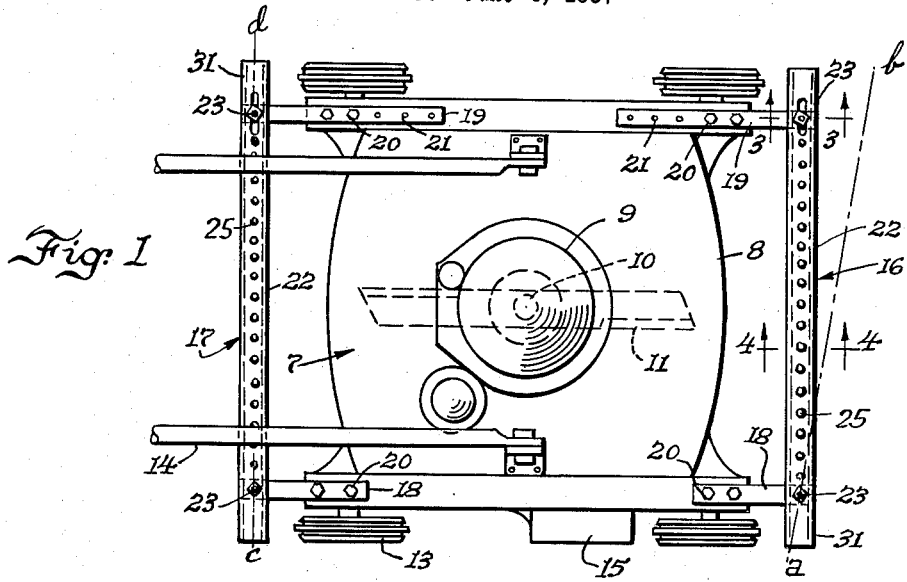
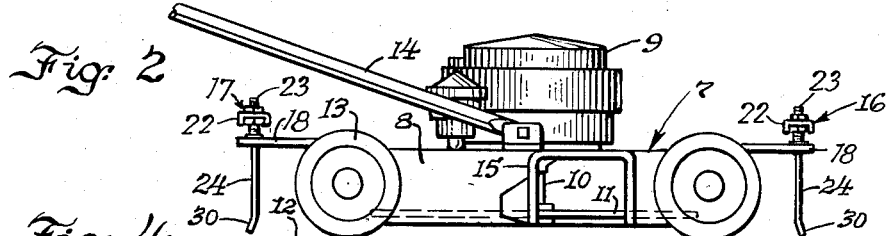
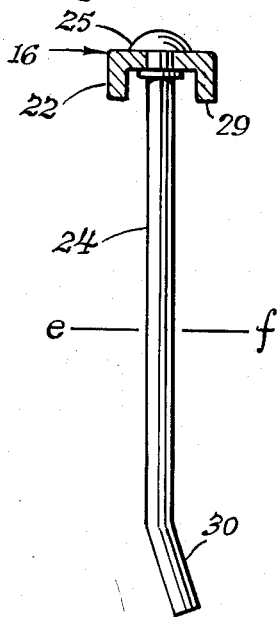
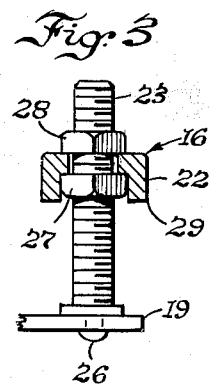
Inventor
Ermen C. Schesser
Atty.

United States Patent Office 2,982,079
Patented May 2, 1961

2,982,079

MOWER SAFETY GUARD

Ermen C. Schesser, Dubuque, Iowa
(P.O. Box 1103, Madison 1, Wis.)

Filed June 4, 1957, Ser. No. 663,497

5 Claims. (Cl. 56—25.4)

This invention relates to mower safety guards.

The so-called "rotary" power mowers which have their cutter bar operating in a horizontal plane under the housing have been very popular, but it is generally pretty well recognized that they are dangerous when operated in the conventional way, which is virtually without any guard. A stone, bone, piece of iron, or other debris left on a lawn can cause serious damage to the mower by contact with the cutter bar turning at a high speed, and there is also the danger that the operator or a bystander is apt to suffer serious injury when such debris is thrown by the cutter bar, and while some manufacturers of mowers have gone so far as to design the mower housings to provide a little better enclosure of the cutter bar for some protection of the operator, that is about as far as I believe safety precautions have been carried. It is, therefore, the principal object of my invention to provide a guard rake on the front of such a mower, which, if not provided as a part of the original equipment, may be easily applied as an attachment to existing machines, either by the owner himself or by a service man, and which, when properly applied and properly adjusted, will function as a bumper to prevent serious injury, if a child gets in the way of the mower, the guard rake being rigid enough to serve as a dependable guard and preventing even a fallen child from getting run over and coming in contact with the cutter bar, the guard rake functioning incidentally also to pick up such things as sticks, stones, bones, toys and other debris and pushing them to that side toward which the mowed grass is thrown.

I provide the frame of the guard of light construction, and provide the rake teeth of spring wire, so that the total weight of the attachment is kept low and the mower is not too heavily encumbered to interfere with easy all around operation, the rake teeth being furthermore narrow enough in the plane of raking not to offer too much resistance to forward movement through the grass, especially when the grass is high, so that there is not too much difficulty in pushing the mower along. The flattening of the teeth in the plane of raking makes for increased strength and rigidity in this direction also, which is so important for a guard. The guard rake teeth are preferably mounted on a bar that is adjustable vertically relative to the mower to obtain the right raking operation without too much drag on the mower and also compensate for wear on the ends of the teeth.

While the guard rakes are in many cases applied only to the fronts of mowers, they will be applied to both the front and rear ends of mowers, where the mower as herein disclosed is reversible and the handle is pivoted to the middle portion of the housing to swing toward either end. Also, while the guard rakes are in most cases set at an angle relative to the leading end of the mower the same may be mounted parallel to the leading end but adjustable to one or more angular positions, to make the same universally adaptable.

The invention is illustrated in the accompanying drawing, in which—

Figs. 1 and 2 are a plan view and side view, respectively, of a rotary power mower having safety guards applied thereto made in accordance with my invention;

Fig. 3 is a section on the line 3—3 of Fig. 1;

Fig. 4 is a section on the line 4—4 of Fig. 1, and

Figs. 5 and 6 are sections of different rake teeth.

The same reference numerals are applied to corresponding parts throughout these views.

Referring to the drawing, the reference numeral 7 designates a rotary power mower comprising a generally rectangular housing 8 carrying an engine 9 on top thereof, the driven shaft 10 of which is vertically disposed and drives a cutter bar 11 operating under the housing in a horizontal plane at a predetermined elevation with respect to the ground 12 on which the rollers 13 supporting the housing rest. The usual handle 14 is pivotally connected to and extends upwardly from the middle of the housing 8, and the mowed grass is discharged to one side of the machine through the usual discharge neck 15.

In accordance with my invention, guard rakes are provided at the front and rear of the reversible mower 7, as shown at 16 and 17, each rake being carried on a pair of arms 18 and 19, fastened by bolts 20 to the top of the housing 8. The arm 19 of each pair is much longer than the arm 18 and has a series of holes 21 provided therein in evenly spaced relation, spaced the same distance apart as the holes for bolts 20, so that each of the channel bars 22, which is adjustably mounted on the outer ends of the arms 18 and 19 on bolts 23, may be mounted parallel to the front end of the mower and rear end of the mower, as shown in Fig. 1, or at any one of several angular positions, one of which is indicated by the dot and dash line *ab* in Fig. 1, the angularity of course depending upon which ones of the holes 21 receive the bolts 20. Thus, each rake provided by a plurality of closely spaced spring wire teeth 24 riveted at their upper ends to the bars 22, as indicated at 25, may be set to rake in a straightforward direction or toward the discharge side 15 more or less, or one may be set one way for one kind of operation, as at *cd* in Fig. 1, and the other the other way, as at *ab* in Fig. 1 for the other kind of operation. These attachments are therefore universally adaptable to the different needs of different lawns, it being obvious that with a conventional one-way machine, having only one rake on it on the front, the rake can be set at any convenient angle for a fairly flat lawn, whereas too extreme an angle would not be suitable where there are abrupt hills and valleys, a small angle, if not a parallel setting, being recommended for those places. Bolts 23, as indicated in Fig. 3, are riveted to the front ends of the arms 18 and 19, as at 26, for simplicity and economy, but the bars 22 are vertically adjustable on the bolts 23 by means of an adjusting nut 27 and lock nut 28 provided on each of the bolts. The flanges 29 of the channels 22 hold the nut 27 on each bolt against turning, so that when an adjustment is made with the nuts 27, there is no danger of its being changed accidentally, due to vibration of the machine. Due to the forward inclination of the lower ends 30, indicated in Figs. 2 and 4, the teeth of the trailing rake in a two-way mower having two rakes applied, as shown in Fig. 2, will tend to ride over objects instead of picking them up. The extending end portions 31 of the bars 22 serve as fenders or bumpers in front of the wheels 13.

In operation, the rakes 16 and 17 afford the same mower safety guard advantages when operating the mower in either direction. Sticks, stones, bones, toys and other debris picked up by the front guard rake teeth 24 are moved to the side toward the discharge 15 by reason of the acute angular relationship of the guard with respect to the forward motion of the mower, when the guards are set, as shown at *ab* in Fig. 1, the debris being therefore deposited on the same side as the mowed grass is thrown so that the same debris will not have to be picked up repeatedly. If the rake teeth 24 are provided of sufficient length so that the bar 22 can be mounted at a given elevation above the supporting arms 18 and 19, as shown in Fig. 2, the bar 22 may be adjusted downwardly from time to time as the rake teeth show evidence of wearing off on their lower ends, and in that way the same close spacing of the guard rake teeth with respect to the ground may be maintained for a long time by periodic adjustment. Since the hexagonal nuts 27 determine the elevation of the bars 22 and these nuts are held against turning by contact of the flat sides thereof with the flanges 29, these nuts being adjusted before the bars 22 are dropped down in place on the nuts, there is no danger of the adjustment changing accidentally once the lock nuts 28 have been properly tightened, regardless of vibration of the machine in operation. The lightness of the safety guard rakes and the fact that the rake teeth are fine enough to rake easily through the grass makes the application of these safety guard rakes practical because the mower is not too heavily encumbered to be easily maneuverable, and there is not too much resistance offered to the forward movement through the grass, even when it is deep, to make it too difficult for the operator to push the mower. These safety guard rakes may be easily applied to existing machines when not provided as a part of their original equipment.

In Fig. 5 I have indicated a substantially circular section of one of the guard rake teeth 24, the section being taken on the line *ef* of Fig. 4. The arrow 32 at the right indicates the direction of forward travel of the rake. In Fig. 6 I have indicated a rake tooth 24' of flat substantially rectangular cross-section, elongated in the direction 32 of forward travel, with the thought that the teeth 24 may be flattened to this section below the plane of the line *ef* in Fig. 4, with a view to greater strength and rigidity through the major portion of the length of the teeth in the plane in which the teeth, especially in their function as a safety guard, must assume most of the stresses and strains, the flattened section serving to reinforce the teeth to resist deformation and at the same time reduce drag on the forward movement of the mower through the grass, especially where the grass is fairly high, so that the mower can be moved more easily. With teeth flattened in this way the spacing of the teeth between centers may be decreased and hence more teeth can be mounted on a given length of bar for improved safety guard action, and at the same time better raking action, without too much increase in the resistance to forward movement of the mower.

It is believed the foregoing description conveys a good understanding of the objects and advantages of my invention. The appended claims have been drawn to cover all legitimate modifications and adaptations.

I claim:

1. In combination with a mowing machine having a housing mounted on ground engaging wheels, a guard for use on said machine during mowing comprising a pair of arms mounted on and extending horizontally forwardly from said housing, at least one of said bars being adjustable endwise to project forwardly a different distance than the other arm, a horizontal bar pivotally connected at its opposite ends to the front ends of said arms for disposition parallel to the front of the housing or at an acute angle thereto, depending upon the adjustment of the one arm, and fairly rigid rake teeth secured to said bar and extending downwardly therefrom approximately to ground level and spaced apart substantially equal distances laterally of the machine.

2. The combination set forth in claim 1, including means whereby said bar is adjustable up and down relative to said arms for adjustment of the elevation of the rake teeth relative to the ground and to compensate simultaneously for wearing off of the lower ends of all of the rake teeth on the bar.

3. Guards for the opposite ends of a reversible mowing machine having a housing mounted on ground engaging wheels, a motor on the housing driving a cutter blade operating in a horizontal plane under the housing, and handle means for pushing the machine selectively in either direction, each of said guards comprising a pair of arms mounted on and extending outwardly from said housing parallel to the line of movement of the machine in mowing, a bar carried on the outer ends of said arms, and rake teeth secured to said bar and extending downwardly therefrom approximately to ground level and spaced apart substantially equal distances laterally of the machine, each of said bars being pivotally connected at its ends to its pair of supporting arms, and at least one of said arms being adjustable endwise to project forwardly from said machine a different distance than the other arm to permit disposition of either bar parallel to the adjacent end of the machine and disposition of the other bar the same way relative to the other end or at an angle relative thereto.

4. A guard on the front of a mowing machine for use during mowing, said machine having a housing mounted on ground engaging wheels, said guard comprising a pair of arms mounted on and extending horizontally forwardly from said housing, bolts extending upwardly from said arms, a horizontal bar disposed crosswise relative to the front of said housing having holes in the end portions thereof receiving said bolts, nuts threaded on said bolts above and below said bar whereby the latter is adjustably supported and secured at a selected elevation with respect to said housing to compensate simultaneously for wearing off of the lower ends of all of the rake teeth on the bar, and rake teeth secured to said bar and extending downwardly therefrom approximately to ground level and spaced apart substantially equal distances laterally of the machine.

5. A guard structure as set forth in claim 4, wherein said bar has a longitudinal reinforcing flange provided thereon arranged to engage one of the nuts on each of said bolts to prevent turning thereof from adjusted position.

References Cited in the file of this patent

UNITED STATES PATENTS

| | | |
|---|---|---|
| 375,892 | Patten | Jan. 3, 1888 |
| 1,688,222 | Andersen | Oct. 16, 1928 |
| 1,732,350 | Best | Oct. 22, 1929 |
| 1,918,357 | Wagner | July 18, 1933 |
| 2,157,620 | McGrath et al. | May 9, 1939 |
| 2,304,873 | Bangert | Dec. 15, 1942 |
| 2,476,526 | Badlat | July 19, 1949 |
| 2,488,140 | Phillips et al. | Nov. 15, 1949 |
| 2,559,897 | Phelps | July 10, 1951 |
| 2,564,586 | Smith et al. | Aug. 14, 1951 |
| 2,709,882 | Abel | June 7, 1955 |
| 2,719,396 | Morris et al. | Oct. 4, 1955 |
| 2,794,309 | Tabac | June 4, 1957 |